United States Patent [19]

Cronfel

[11] 3,893,927
[45] July 8, 1975

[54] FILTERED THROTTLING VALVE

[76] Inventor: Ramsey L. Cronfel, 1391 Cumberland, Elk Grove, Ill. 60007

[22] Filed: July 27, 1973

[21] Appl. No.: 383,181

[52] U.S. Cl. ........ 210/418; 137/625.3; 137/625.32; 251/207
[51] Int. Cl. ......................... B01d 29/20; F16k 1/52
[58] Field of Search ....... 137/625.3, 625.31, 625.32; 210/418; 251/118, 207, 209

[56] References Cited
UNITED STATES PATENTS

| | | | |
|---|---|---|---|
| 2,843,149 | 7/1958 | Peters | 137/625.3 |
| 3,428,086 | 2/1969 | Glasgow | 137/625.3 |
| 3,602,261 | 8/1971 | Brown et al. | 137/625.3 |
| 3,631,891 | 1/1972 | Brumm | 137/625.3 |
| 3,693,659 | 9/1972 | Parola | 137/625.3 |
| 3,767,056 | 10/1973 | Neuman | 210/418 X |

Primary Examiner—Charles N. Hart
Assistant Examiner—Robert H. Spitzer

[57] ABSTRACT

A throttling valve with an integral filter is provided having a cylindrical body and a filtering valve stem. The valve body includes inlet and outlet ports in its side and bottom and the valve stem seats in a valve body well connecting the ports. The valve stem has drilled transfer passages with flow restricting conduits and an integral filtering system. A camming means is provided to move the valve stem to and from a seated position.

6 Claims, 5 Drawing Figures

PATENTED JUL 8 1975  3,893,927
FIG. 1
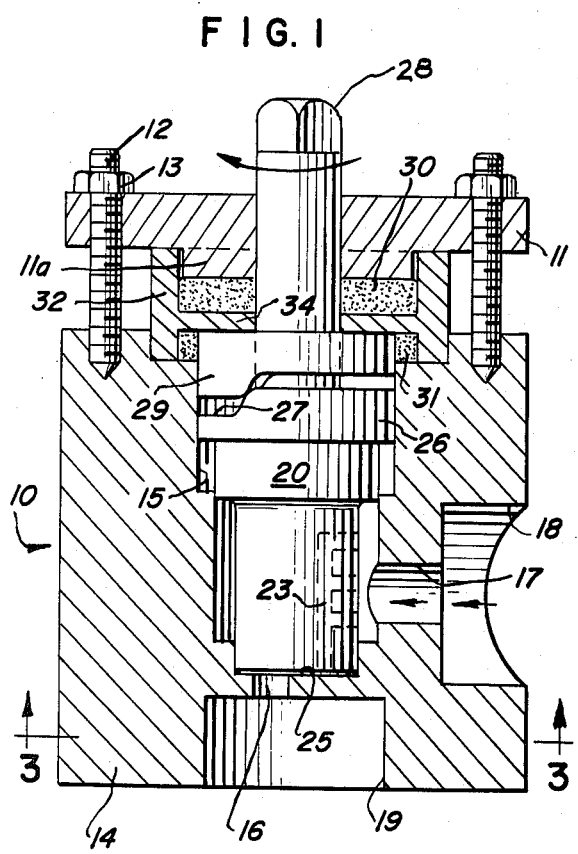
FIG. 2
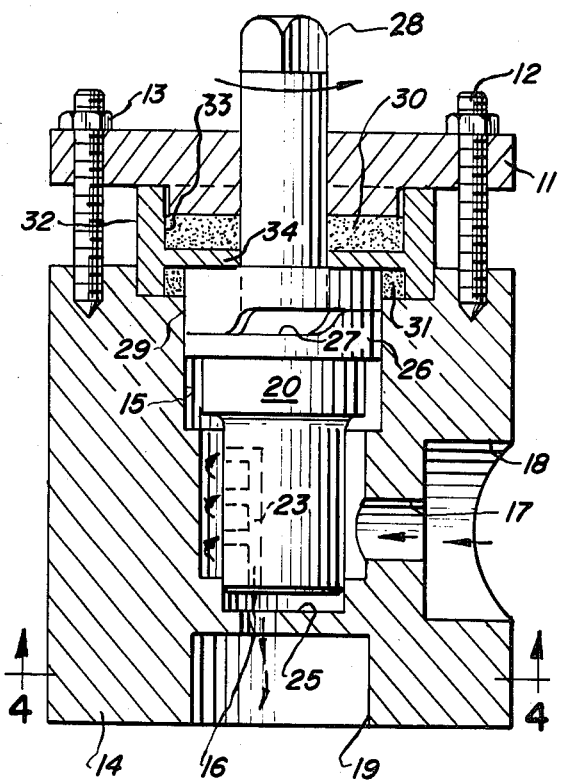
FIG. 3
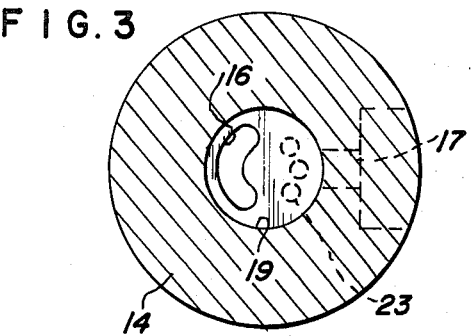
FIG. 4
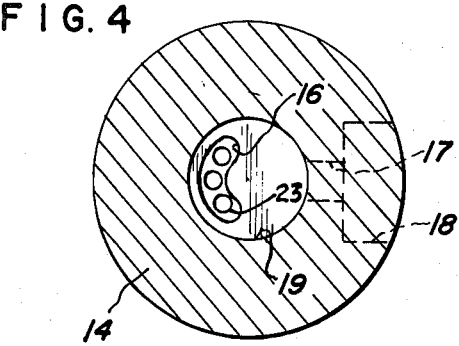
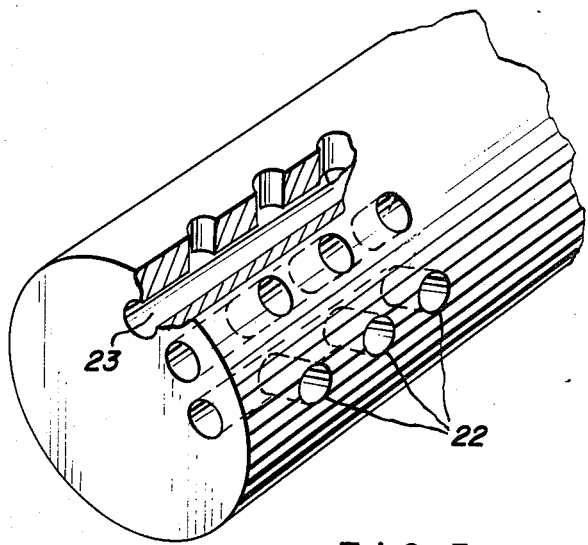
FIG. 5

FILTERED THROTTLING VALVE

BACKGROUND OF THE INVENTION

The field of the invention relates to throttling valves for steam, water, and other fluids, and more specifically to a new development of a valve with flow-restricting conduits and with an integral filter that is easily manufactured and serviced. It has long been a problem of throttling valves, which must adjustably restrict the flow, to avoid clogging due to scale, undissolved solids, impurities and crud.

It is known that certain valves provide the necessary adjustment to throttle any flow for which they are designed and thus effectuate the required head change. Many valves can be designed to operate at high temperatures and pressures by proper selection of materials and seating surfaces. It is also well known to filter the flow to prevent clogging and it is common practice to place such filters upstream in series with throttling valves.

Attempts have been made to compensate for the aforementioned clogging in throttling valves by using replaceable filters and low cost filter material; however, this has resulted in servicing problems, leaks and complicated constructions. It has been found that a filter mounted integral with the valve stem allows it to be easily cleaned by merely removing the valve stem since most valve stems are serviceable without need of disturbing the line connections to the valve. Similarly, the application of a portion of the valve stem as a filter eliminates the need and expense of separate filters.

In addition, the present application seeks to apply this integral filter to a valve construction which has a combined rotary and axial action giving an easily adjusted opening rate for accurate throttling. Others have attempted to provide a good design for a throttling valve. For example, the patents to Loss U.S. Pat. No. 486,722, Wilson U.S. Pat. No. 3,323,774, Davis U.S. Pat. No. 1,280,177, Vierling U.S. Pat. No. 2,733,890, and Vitek U.S. Pat. No. 1,511,692, disclose a variety of constructions having some of the aforementioned seating features. While these valves include transfer passages and/or the desirable valve stem motion, they still suffered from in-service clogging due to scale, impurities, undissolved solids and crud build-up during use.

SUMMARY OF THE INVENTION

The subject invention seeks to overcome the disadvantages of the prior art discussed above.

Accordingly, it is an object of the present invention to provide an improved valve with an integral filter in the valve stem which can be readily serviced by removal of the valve stem and which is capable of reliable operation during throttling.

It is another object of the present invention to provide an improved integral filter for a throttling valve which is simple and economical to fabricate or service.

In carrying out the invention, a throttling valve is provided, including a cylindrical valve body and a valve stem to fit within a well in said body; an inlet port and an outlet port in said body which can be interconnected by transfer passages in the valve stem, and an annular packing gland with an opening for the valve stem is designed to mount atop the valve body for sealing the well and stem which is movably retained thereby. The valve body supports cooperating camming means for imparting axial movement as the stem is rotated. The stem transfer passages consist of axial flow-restricting conduits connecting the bottom of the stem or plug portion with radial, filtering conduits. When the valve stem is turned, it brings into registration the plug and body openings, and the transfer passages allow flow. The surface area of the openings of the radial conduits is greater than the surface area of the opening of the axial conduits, consequently; most scale, impurities and crud are trapped before they can reach the seat area and cause a valve malfunction.

BRIEF DESCRIPTION OF THE DRAWING

FIG. 1 is a side elevational view partially in cross section of the valve in the closed or seated position;

FIG. 2 is a side elevational view partially in cross section of the valve in the open or throttling position;

FIG. 3 is a sectional view of the outlet port taken along line 3—3 of FIG. 1;

FIG. 4 is a sectional view of the outlet port taken along line 4—4 of FIG. 2; and FIG. 5 is a partial perspective view, with a portion removed for illustrating for clarity the integral filter transfer ports in the lower end or plug portion of the valve stem.

DESCRIPTION OF THE PREFERRED EMBODIMENT

Referring more particularly to the drawing, a throttling valve is shown in FIG. 1 and is generally indicated by the numeral 10. The valve 10 includes a packing gland 11 which is suitably secured in a conventional manner by studs 12 and associated nuts 13 to valve body 14. Valve body 14 has a well 15 which is generally cylindrical in shape and extends from the top of valve body 14 to an outlet port 16 in the bottom thereof. An inlet port 17 passes through the side of valve body 14, connecting well 15 with the inlet opening 18. Similarly, outlet port 16 connects the bottom of well 15 with the discharge opening 19.

Valve stem 20 is also generally cylindrical and is designed to fit within well 15, the plug or lower end of valve stem 20 is provided with transfer passages consisting of radial conduits 22 and axial conduits 23 as shown in FIGS. 1 and 2. Conduits 23 are designed to restrict the flow to a certain value with a certain pressure difference existing from inlet 18 to outlet 19. There are a plurality of radial conduits 22 connecting to each axial conduit 23, and the diameter of conduits 22 is smaller than that of conduits 23. Consequently, conduits 22 will trap particles of a size that might otherwise plug conduits 23, the flow-restricting conduits. Plugging of one or more conduits 22 up to a limit, will not restrict the flow since there is a greater exposed area in conduits 22 than in conduits 23, the flow-restricting conduits.

Toward the middle of valve stem 20 there is an annularly enlarged portion 26 with an upwardly facing camming surface 27 arranged to cause the valve stem 20 to seat when the stem is turned. At the top edge of well 15 is located an annular or ring shaped cam plate 29 held within well 15 in a manner which will be explained later. Camming surface 27 rides against and cooperates with cam plate 29 causing the required axial stem movement for seating the bottom of stem 20 against seat 25. In a well known manner in the valve art the camming is not severe so the stem 20 is firmly seated but only moderate torque is required to take the stem 20 off the cam and open the valve. That is to say the cam surfaces are only moderately inclined such that the camming is used for seating only. FIGS. 1 and 3 show that the seated stem 20 and more particularly, the openings 23 are not aligned with outlet port 16 when the valve 10 is closed. Conversely, the openings 23 are aligned with the outlet port 16 when the valve is open, see FIGS. 2 and 4. The torque which seats the stem 20 is applied to the nut surfaces at the upper part 28 of the stem 20 by a manual or power actuator not shown.

Retention of the stem 20 within the body 14, and prevention of fluid leakage past the stem 20 may be accomplished in a well known manner involving bonnets, packing, and packing glands. More particularly the stem 20 is movably retained within the well 15, sealing the stem 20 to the valve body 14 to prevent the flow from leaking, two packing seals 30 and 31 and a retaining tube 32 are provided. Tube packing 30 contacts the retaining tube 32 and valve stem 20 to provide sealing. Body packing 31 contacts the retaining tube 32, valve body 14, and the cam plate 29 to provide sealing. Tube packing 30 is compressively held in a recess 33 formed by an internal rib 34 on tube 32. The packing gland 11 has a downwardly extending annular portion 11a which forces packing 30 into contact with the tube 32 and stem 20. Body packing 31 is located in a concentric circular groove at the upper outer circumference of the well 15. The bottom of rib 34 also bears against body packing 31 and cam plate 29 to retain them.

From the foregoing, the operation of the valve 10 and its integral filter should be apparent. When the valve 10 is connected to a supply line at opening 18 and an outlet line at opening 19 so the flow may enter inlet port 17 and pass therethrough and into the transfer passages 22 and 23 should the valve 10 be closed or seated such that the plug of stem 20 is against seat 25, then the flow will be stopped because openings 23 will be against the seat 25 and out of alignment with outlet port 16, see FIG. 3. If the valve 10 is open such that openings 23 are aligned with outlet port 16, then the flow will proceed from opening 18 out the outlet port 16 to the opening 19 which connects to the outlet line. Should the transfer passages 22 and 23 become so clogged that proper throttling may not be achieved even with the valve 10 opened completely, it is an easy matter to remove the packing gland 11, the retaining tube 32 with its packing 30, and the valve stem 20 in order to clean the stem 20 and the well 15. Servicing when necessary is simplified since the valve body 14 need not be removed from the pipe line.

It is to be understood that while a particular filtering arrangement has been described, the invention is not limited to the above-described arrangement of passages nor to the specific manner in which seating of the stem is effected. It is important that there be a greater exposed area in conduits 22 than in conduits 23, such that particles can be trapped up to a certain limit without restricting the flow. Whereas the drawing shows a plurality of transfer passage inlet openings of a circular, radial type for each exit opening, it is possible to make the inlet opening(s) a different shape(s), such as small continuous linear openings, one for each exit opening. Similarly, the exit openings can take different shapes.

While a particular embodiment of the invention has been shown, the invention is not limited thereto since many minor modifications may be made; and it is therefore, contemplated by the appended claims to cover any such modifications that fall within the true spirit and scope of the invention.

The invention having thus been described, what is claimed and desired to be secured by Letters Patent is:

I claim:

1. A pressure valve for throttling flow comprising a valve body having an inlet port and an outlet port, control means in said body for providing a fluid communication from said inlet to said outlet, said control means including a descending well extending from the top of said body to said outlet port and being in communication with said inlet port, an elongated valve stem movably mounted in said well for controlled axial and rotary motion, seating means within said well around said outlet port for cooperating with said valve stem to throttle the flow, movement means for imparting axial and rotary motion to said valve stem, and said valve stem having internal transfer passages which cooperate with said seating means when said valve stem is in a valve throttling position allows fluid flow through said transfer passages between said inlet and outlet ports and when said stem is cammed into a valve seated position prevents fluid flow through said transfer passages between said inlet and outlet ports; filtering means integral with said transfer passages and having a filtering inlet area which is greater than the filtering outlet area and being arranged to strain the throttled flow, packing means for movably sealing said valve stem at the upper part of said body to prevent fluid from leaking from said body.

2. The valve for throttling flow of claim 1 wherein said movement means includes a first cam associated with said body cooperating with a second cam on said valve stem.

3. The valve for throttling flow of claim 2 wherein each of said transfer passages include axial conduits extending upwardly from the bottom of said valve stem to a point above the top of said inlet port elevation as the same would appear on said unseated valve stem, a plurality of radial conduits connecting each of said axial conduits, a filtering restriction formed by the difference in surface area between the inlet openings in said side surface of said stem resulting from said radial conduits and the exit opening in said bottom of said valve stem resulting from said axial conduits.

4. The valve for throttling flow of claim 3 wherein an arcuately shaped orifice restriction concentrically positioned in said outlet port for cooperating with the vertical conduits and for controlling the exposure of said transfer passages to said outlet port during throttling such that the flow rate may be adjusted.

5. A pressure valve for throttling flow comprising a valve body having an inlet port and an outlet port, control means in said body for providing fluid communication from said inlet to said outlet, said control means including a descending well extending from the top of said body to said outlet port and being in communication with said inlet port, an elongated valve stem movably mounted in said well for controlled axial and rotary motion, seating means within said well adjacent said outlet port for engaging said valve stem to direct the flow, said valve stem having a first cam associated with a generally annular valve stem packing member cooperating with a second cam on said valve stem packing compressed by said annular packing member to contact said valve stem, said valve body and said first cam for sealing the upper part of said valve stem into said descending well and for sealing the upper part of said body to prevent leaking, and said valve stem having internal transfer passages which cooperate with said seating means when said valve stem is in a valve throttling position allows fluid flow through said transfer passages between said inlet and outlet ports and when said stem is cammed into a valve seated position prevents fluid flow through said transfer passages between said inlet and outlet ports, filtering means integral with said transfer passages and having a filtering inlet area which is greater than the filtering outlet area, and being arranged to strain the throttled flow.

6. The valve for throttling flow of claim 5 wherein each of said transfer passages include axial conduits extending upwardly from the bottom of said valve stem to a point above the top of said inlet port elevation as the same would appear on said unseated valve stem and a plurality of radial conduits connecting each of said axial conduits, a filtering restriction formed by the difference in surface area between the inlet openings in said side surface of said stem resulting from said radial conduits and the exit opening in said bottom of said valve stem resulting from said axial conduits.

* * * * *